Figures 1, 2, 3, 4, 5:
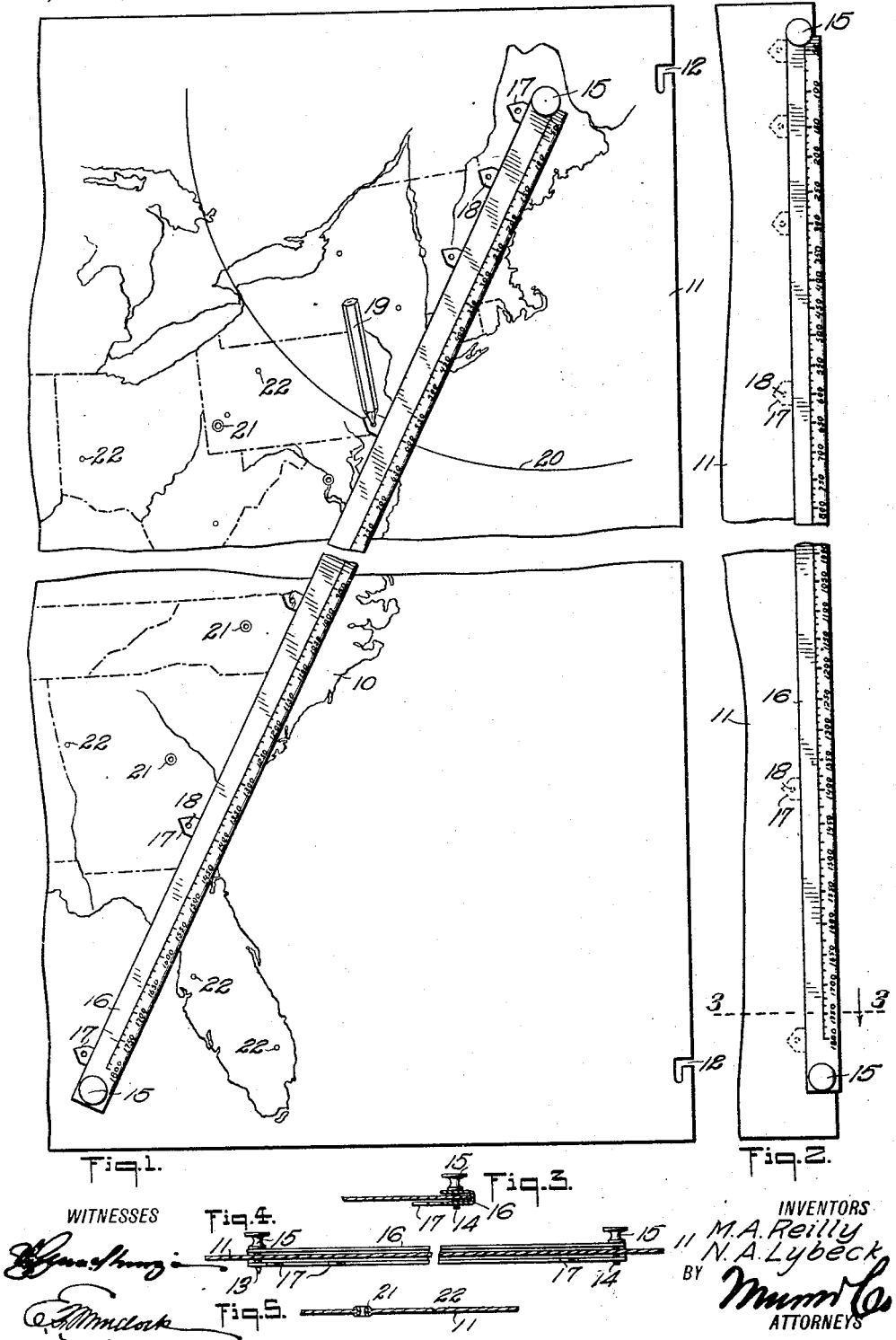

M. A. REILLY & N. A. LYBECK.
PARCEL POST MAP AND ZONE FINDER.
APPLICATION FILED AUG. 31, 1915.

1,199,610.

Patented Sept. 26, 1916.

WITNESSES

INVENTORS
M. A. Reilly
N. A. Lybeck
BY
ATTORNEYS

UNITED STATES PATENT OFFICE.

MARY A. REILLY AND NELS A. LYBECK, OF NEW YORK, N. Y.

PARCEL-POST MAP AND ZONE FINDER.

1,199,610. Specification of Letters Patent. Patented Sept. 26, 1916.

Application filed August 31, 1915. Serial No. 48,170.

*To all whom it may concern:*

Be it known that we, MARY A. REILLY and NELS A. LYBECK, both citizens of the United States, and residents of the city of New York, borough of Brooklyn, in the county of Kings and State of New York, have invented a new and Improved Parcel-Post Map and Zone Finder, of which the following is a full, clear, and exact description.

Among the principal objects which the present invention has in view are: to provide a map with pivot members to definitely hold the zone finder; to designate by said pivot members the importance or characteristic of the location; to provide means for securely attaching a map and finder therefor when inactively disposed; to provide a finder having distinguishing members and in associated relation thereto, holders for a zone marker; and to provide a finder having the characteristics enumerated, said finder having graduate markings denoting miles or units of space.

*Drawings.*—Figure 1 is a view of a map and finder constructed and arranged in accordance with the present invention, said map and finder being shown as parted and contracted, and the finder being shown as in active position on said map; Fig. 2 is a view showing the inactive position of the map and finder, fragments of the map being shown parted and contracted; Fig. 3 is a cross section taken as on the line 3—3 in Fig. 2; Fig. 4 is an edge view of the finder shown in its inactive relation to a map, the map being shown in section in said figure; the map and finder are further shown as parted and contracted; Fig. 5 is a detail view on an enlarged scale of the map, the section being taken through two pivot sockets in said map.

*Description.*—As seen in the accompanying drawings, a map 10 is mounted or printed upon a cardboard backing 11. Opening from one edge of the backing 11 are bayonet slots 12, wherein enter the shanks of a pin point 13 and a screw 14. The pin 13 and the screw 14 are each provided with a manipulating head 15. The head 15 of the screw 14 is knurled or similarly formed to facilitate the manipulation of the screw 14 when binding the finger 16 to the backing 11.

The finder 16 is preferably constructed of metal and is folded to form a channel to receive the edge of the backing 11. The screw 14 is free to turn in a perforation provided therefor in the upper side of the finder forming the channel and engages threads tapped in the lower side of the channel. Hence it follows that when the screw 14 and pin 13 have been introduced into the bayonet slots 12 of the backing 11, the finder is held rigidly to the backing 11 by turning up the screw 14. This operates to clamp the sides of the finder upon the interposed backing 11, though the end of the finder 16, which is equipped with the pin point 13, is not compressed upon the backing 11, it will nevertheless be held from parting therefrom by the engagement of the sides of the finder at the opposite end.

A finder 16 as constructed and arranged in accordance with the present invention, has three associated functions, to wit: to find the zone of any given point from an established point on the map 10; to form markings on the said map to indicate zone areas or zones; and to show in miles the distance from an established point to any point within the compass of the finder 16. To this end, the finder is provided with a number of pointed extensions 17, as shown in the drawings, the pointed ends of the various extensions being related to the pin point 13 in correspondence with the zones established for the parcel post regulation. Adjacent the ends of the extensions 17 are perforations 18. The perforations 18 hold the marking end of a marking instrument, such as the pencil 19 shown in Fig. 1 of the drawings, by means of which there may be inscribed a zone-line, such as indicated by the numeral 20. On the rear or folded edge of the finder 16 is formed a scale or markings showing the distance of the scale markings from the pin point 13. The scale of the map and the scale of the markings are the same, so that a person using the finder may, by placing the point 13 in any position on the map, ascertain the distance in miles from the same point to another point on the map.

In handling a map and finder constructed and arranged in accordance with the above description and as shown in the accompanying drawings, it will be understood that in the inactive position of the map and finder the latter is held on the edge of the map by means of the pin point 13 and screw 14, the latter being manipulated to clamp the backing 11 after the pin point and screw have been disposed in the bayonet slots 12 provided in said backing.

The map 10 and backing 11 therefore are provided with a series of metal eyelets 21, said eyelets being preferably disposed to indicate cities or post-offices of major importance. As shown best in Fig. 5 of the drawings, the eyelets 21 extend through the backing 11. The map and backing are further furnished with a series of indentations 22 to indicate post-offices or cities of relatively minor importance. These indentations, as shown in Fig. 5 of the drawings, do not penetrate through the backing 11. This means is employed for giving definite pivot locations for the swing of the pointer around the pin point 13; also to avoid undue wear of the pin point on the map.

Claims:

1. In combination, a map having a plurality of series of pivot sockets formed therein to indicate municipal locations thereon, the members of each of said series being distinguished to show its relation to the series; and a finder having a pivot point adapted for engagement with said sockets.

2. In combination, a map having a plurality of series of pivot sockets formed therein to indicate municipal locations thereon; and a finder having a pivot point adapted for engagement with said sockets, said finder being further provided with a series of lateral extensions arranged with reference to said pointer in correspondence with the postal regulations for parcel post.

MARY A. REILLY.
NELS A. LYBECK.

Witnesses:
E. F. MURDOCK,
G. H. EMSLIE.

Copies of this patent may be obtained for five cents each, by addressing the "Commissioner of Patents, Washington, D. C."